June 12, 1934.  L. A. JONES  1,962,310
METHOD OF MAKING SOUND RECORDS
Filed Jan. 10, 1930  2 Sheets-Sheet 1

Inventor
Loyd A. Jones.
By Newton M. Perriss
Attorney

June 12, 1934.  L. A. JONES  1,962,310
METHOD OF MAKING SOUND RECORDS
Filed Jan. 10, 1930  2 Sheets-Sheet 2
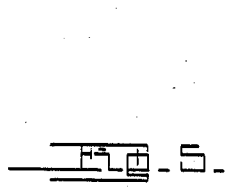
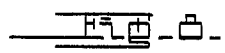
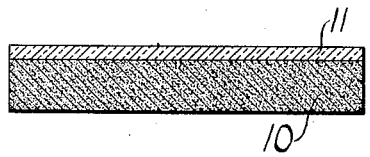
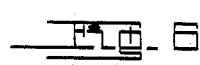
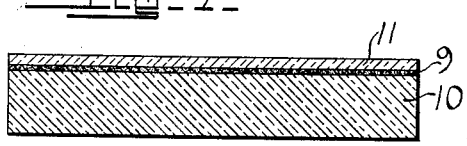
Inventor
Loyd A. Jones.
By Newton M. Perrins
Attorney Patented June 12, 1934

1,962,310

UNITED STATES PATENT OFFICE 1,962,310

METHOD OF MAKING SOUND RECORDS

Loyd A. Jones, Rochester, N. Y., assignor to Eastman Kodak Company, Rochester, N. Y., a corporation of New York Application January 10, 1930, Serial No. 419,941

2 Claims. (Cl. 274—41.6)

This invention relates to photography and more particularly to photographic materials such as films and the like adapted for the preparation of photographic sound records.

In the past much difficulty has been encountered in the photographic reproduction of sound due to the fact that present photographic sound records, when reproduced, seriously distort the lower frequencies while greatly attenuating the volume of the higher frequencies so that in the upper range thereof, necessary for the reproduction of essential overtones, the volume is almost negligible. It has been discovered that much of this inferior reproduction from photographic sound records is due to the reflection of light rays and other radiations from surfaces of the film base during the preparation of the sound record which effect is frequently referred to in the art as halation. Halation in both positive and negative photographic sound records degrades the sound image by spoiling the definition or sharpness thereof with the result that naturalness of tone is not attainable from present photographic records, which lack of definition obscures the higher frequencies thereof so that it is impossible to obtain substantially correct relative volume throughout the range of frequencies which it is desired to reproduce.

While halation effects have been recognized in picture photography for some time it has not been the usual practice to take steps to eliminate these effects in motion pictures. The absence of halation-preventing means in motion picture production is in part due to the fact that the eye is not only not critical of picture distortion but actually finds a certain amount of distortion in the reproduced pictures, pleasing. With these conditions and others to be satisfied it is now customary in motion picture photography to employ high speed emulsions with relatively low resolving power of about forty lines per millimeter so that distortion due to halation is obscured by the lack of picture definition.

In contrast to this condition where the eye does not recognize slight inaccuracies in motion pictures, the ear is extremely critical to distortion and while emulsions of low resolving power are used for motion picture work it has been found important in photographic sound records to use fine grained emulsions of slow speed and having a maximum resolving power of from 75 to 120 lines or even better, per millimeter. It is believed that the failure, before applicant's discovery, of recognizing the need for eliminating halation effects and providing means to eliminate them in sound film is due to the fact that photographic recording and reproduction of sound has followed motion picture techinque where halation effects have been almost entirely disregarded.

One of the objects of the present invention is to provide a film or other photographic record for use in sound recording and sound reproduction in which halation is reduced to a minimum so that fidelity of tone and correct relative volume over a wide range of frequencies, results when the record is reproduced. Another object is to provide a suitable light or radiation absorbing medium within or on a surface of a photographic record base which may transmit rays essential in forming said images and which will greatly reduce or which may entirely absorb undesired reflected radiations.

Other objects will appear from the following description and claims when taken with the drawings in which:

Fig. 5 is a photomicrograph of an 8000 cycle note photographically recorded as a sound record of the variable area type when the halation effects have been eliminated;

Fig. 6 is a similar photomicrograph of a note at the same frequency showing the results on the record of the halation effects;

Figs. 7 and 8 are modified forms of the photographic strip of the present invention.

Figure 1:
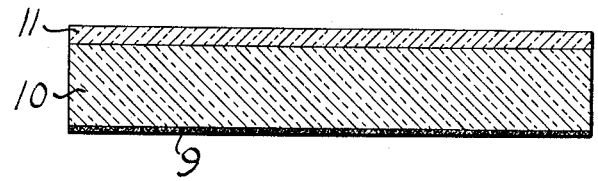
Fig. 1 represents a photographic strip of the present invention to be used in the photographic recording of sound.
Figure 2:
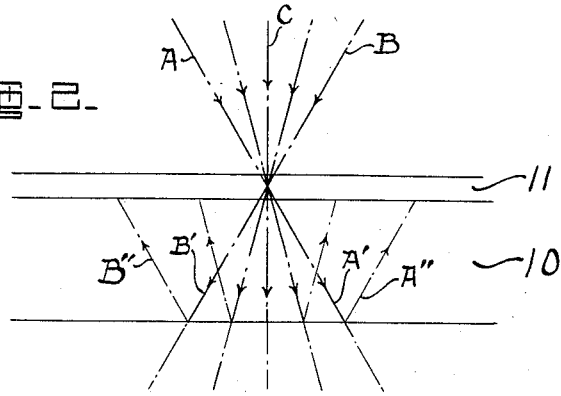
Fig. 2 is a diagram representing halation effects in such a strip in the absence of the present invention.

Referring to Fig. 1 there is represented a photographic sound record strip comprising a transparent base 10 of any suitable material and an emlusion 11. The lower surface of the base 10 carries a layer 9 of dye or other radiation absorbing material to eliminate halation effects as will more fully appear. It has been discovered that when a photographic sound film is subjected to light and other actinic radiations in the absence of a layer such as 9, certain of these radiations are reflected from the surfaces of the base thereof with the result that undesired radiations impinge on the light sensitive elements of the radiation sensitive layer 11 thus interfering with the correct rendition of the photographic sound image. For example if these radiations are represented as a pencil of rays as shown in Fig. 2 one of these rays such as A passes through the base 10 as ray A' and then is reflected within the base from the lower surface thereof as ray A" which in turn adversely affects the sound image formed in the emulsion 11. Likewise ray B passes through the emulsion into the base as ray B' and then is reflected from the lower surface of the base as ray B'' again passing into the emulsion 11. Other rays except ray C are similarly reflected.

The layer 11 may include a dye or other medium which absorbs the radiations to which the emulsion 11 is sensitive, that is, if the emulsion is sensitive to blue or red rays the layer 9 should absorb blue or red rays respectively while if the emulsion is panchromatic, the layer should be a gray or neutral tint.

It is assumed for purposes of this description that this layer is formed of a neutral dye although the invention is not so limited. Such a suitable neutral tint can be made by using zapon black, metanil yellow and toluidine blue in such proportions as to give a visually non-selective tint.

Figure 3:
Fig. 3 is a diagram representing the effect of halation in photographically recording a note of 5000 cycles frequency.
Figure 4:
Fig. 4 is a diagrammatic representation of a note at the same frequency when the halation effects have been eliminated.

The result of this halation effect, indicated in Fig. 2, on a sound record may be explained by referring to Figs. 3 and 4 wherein Fig. 4 is a diagrammatic representation of a 5000 cycle note in the form of a sine wave 12, while Fig. 3 indicates the resulting distortion of this note caused by halation which distortion is represented by the wave 13 wherein it will be seen that the crests and trough of the original sine wave are flattened with the result that when the record of such a modified note is reproduced the fundamental frequencies are distorted and the overtones are reduced to negligible volume. If instead of a single frequency note, a record bears a photographic recording of speech, the reproduction thereof is unnatural and lacking in richness due to the almost complete absence of the higher frequencies and the overtones necessary to give character and naturalness to speech. If such a record bears a musical impression, the intermediate frequencies are distorted, while the higher frequencies and overtones are almost completely absent so that many of the instruments such as the flute and piccolo are almost lost or are not reproduced at all whereas the overtones necessary for the richness and fullness of the musical quality as a whole and essential in distinguishing certain of the instruments from the others, are attenuated almost to the point of extinction. The characer of such reproduced sounds may possibly best be described as unnatural and mechanical. The foregoing deficiencies in the previously used type of photographic sound record are thus partially due to halation which greatly reduces the resolving power of the emulsion as indicated in the photomicrograph 14 of an 8000 cycle note variable area sound record of Fig. 6 wherein it will be seen that the definition of the sound image is greatly degraded as compared with the photomicrograph 15 of a similar note represented in Fig. 5 which was recorded in the substantial absence of such halo-forming rays.

Whereas photograhic sound image of Fig. 5 is clear cut, the corresponding sound image of Fig. 6 is fuzzy and poorly defined.

While Fig. 1 shows the layer of radiation-absorbing material 9 on the lower surface of the base 10 it will be understood that this layer may be on the upper surface of the base, that is, between the base and the emulsion as shown as Fig. 7. The invention also contemplates the introduction of a dye or other material within the base for absorbing halo-forming rays which may be introduced uniformly within the body of the base as shown in Fig. 8 or distributed in different portions thereof.

The photographic strip or film of this invention may be used either in translating sound into a photographic sound record or in printing a positive record from the negative sound record so produced. This photographic strip may also be used in preparing positive records but when used for this purpose the radiation absorbing layer 9 is preferably of such character that it can be removed by treatment in the development and fixation process, that is, it should be a fugitive dye. However, it has been found under certain conditions that a photographic sound positive when provided with a radiation absorbing layer 9, formed of a permanent dye, is used, the reproduction is improved.

The term photographing as used in this specification is intended to cover broadly the translation of sound into a photographic record and also the printing of a positive sound record from a negative sound record.

It will be understood that the present film strip may be employed in the usual devices utilized in translating sound into photographic rays to form a sound negative on a photographic strip, while the usual devices may be employed to print a positive sound record from such a negative and to reproduce sound from the positive record so printed.

While I have described several forms of film, the one that has been found most useful in sound recording and reproduction carries an emulsion of the type known as "fine grained positive", which has been panchromatized, and which carries separate from the emulsion a neutral dye layer absorbing waves of all wave lengths with reasonable uniformity. The effective resolving power is dependent on halation and by means of such a film I have been able to obtain sound reproduction notably better in quality than has been heretofore possible, to reproduce notes from 5000 to 8000 cycles well, and to render perceptible notes of the order of 10000 cycles.

When this is used with a tungsten filament as a source of light unusually good results are obtained since this is rich in rays of all wave lengths.

Having thus described my invention, what I claim as new and desire to secure by Letters Patent is:

1. The method of making a photographic record of notes of the order of 8000 cycles that comprises exposing to a light beam influenced by such a note a photographic film carrying a fine grained, panchromatic, positive emulsion and a dye layer absorbent of all wave length, to which the emulsion is sensitive.

2. A method of making and reproducing musical notes of the order of 8000 cycles photographically that comprises exposing to a light beam influenced by such a note a photographic film carrying a fine grained panchromatic positive emulsion and a dye layer absorbent of light of all wave lengths to which the emulsion is sensitive, forming a visible record therefrom and utilizing such visible record in the reproduction of sound.

LOYD A. JONES.